United States Patent
Apfelbeck

[11] Patent Number: 6,092,106
[45] Date of Patent: Jul. 18, 2000

[54] METHOD AND CONTROL MECHANISM FOR A DATA FETCHING SERVICE

[75] Inventor: Jürgen Apfelbeck, Hagen, Germany

[73] Assignee: Alcatel, Paris, France

[21] Appl. No.: 08/991,674

[22] Filed: Dec. 16, 1997

[30] Foreign Application Priority Data

Apr. 17, 1996 [DE] Germany ............................ 196 15 027

[51] Int. Cl.[7] .................................................. G06F 15/16
[52] U.S. Cl. ............................................ 709/217; 709/218
[58] Field of Search .................................... 709/206, 217, 709/238, 244, 218, 201, 202, 203, 204, 205; 713/201, 202; 358/403, 507

[56] References Cited

U.S. PATENT DOCUMENTS

| | | | |
|---|---|---|---|
| 4,630,196 | 12/1986 | Bednar, Jr. et al. | 364/200 |
| 5,339,156 | 8/1994 | Ishii | 358/402 |
| 5,392,336 | 2/1995 | Chang et al. | 379/93 |
| 5,438,433 | 8/1995 | Reifman et al. | 358/468 |
| 5,452,099 | 9/1995 | Von Meister | 358/403 |
| 5,459,584 | 10/1995 | Gordon et al. | 358/434 |
| 5,461,488 | 10/1995 | Witek | 358/402 |
| 5,483,580 | 1/1996 | Brandman et al. | 379/88 |
| 5,559,611 | 9/1996 | Bloomfield et al. | 358/407 |
| 5,857,013 | 1/1999 | Yue et al. | 379/67 |

FOREIGN PATENT DOCUMENTS

| | | |
|---|---|---|
| 0504068 | 9/1992 | European Pat. Off. . |
| 0616462 | 9/1994 | European Pat. Off. . |
| 9103115 | 3/1991 | WIPO . |
| 9739567 | 10/1997 | WIPO . |

OTHER PUBLICATIONS

"Private Facsimile Mail Trend", A. Isoyama et al, *NTT Review*, 3 (1991) Mar., No. 2, Tokyo, Japan, pp. 26–33.

*Primary Examiner*—Mehmet B. Geckil

[57] ABSTRACT

In particular, when large amounts of data must be fetched by a sender (S) in a telecommunications network (N) and transmitted in the telecommunications network (N), the moment when the data are fetched is determined by a controller (CM) of the fetching services.

32 Claims, 1 Drawing Sheet

METHOD AND CONTROL MECHANISM FOR A DATA FETCHING SERVICE

BACKGROUND OF THE INVENTION

1. Technical Field of the Invention

The present invention concerns a method for a data fetching service in a telecommunications network, and a control mechanism therefor.

2. Discussion of Related Art

Such a method and such a control mechanism are known from U.S. Pat. No. 5,392,336. This patent specification describes a data memory and a fetching service whereby a sender signals an operator of this service that data are to be transmitted to a receiver. The data to be transmitted are then assigned an identification number and the data are subsequently transmitted by the sender to a memory in which they are stored. After the identification number assigned to these data is received by a receiver, the data are transmitted from the memory to this receiver.

With the known data storage and fetching service the sender or the receiver of the data always determine when the data are transmitted from the sender to the memory, or from the memory to the receiver.

SUMMARY OF INVENTION

It is the object of the present invention to provide a better utilization of a telecommunications network, particularly when large amounts of data are transmitted.

According to a first aspect of the invention, a method for a data fetching service in a telecommunications network, which comprises a data sender and a control mechanism for controlling the fetching service, wherein the sender prepares data for fetching, wherein the sender signals a data fetching request to the control mechanism, and wherein the control mechanism receives the signalled request, is characterized in that after receiving the request, the control mechanism determines in accordance with at least one criterion when the data are to be fetched from the sender.

According to a second aspect of the invention, a control mechanism for a data fetching service in a telecommunications network, with a receiving means for receiving a signal from a sender of the telecommunications network, whereby the sender conveys a data fetching request to the control mechanism, is characterized in that the control mechanism is designed so that after receiving the request it checks whether at least one criterion has been fulfilled, and if this is the case it causes the data to be fetched from the sender, so that the time of the data fetching from the sender is determined by the control mechanism.

It is an advantage that the operator of the fetching service can determine at which point in time the data are fetched from the sender. Because of the better utilization of the telecommunications network capacity, low-cost transmission fees can be established.

In an advantageous embodiment of the invention, the data to be fetched are directly transmitted by the sender to one or several receivers. It is an advantage in that case if the fetching service operator requires no intermediate memory.

BRIEF DESCRIPTION OF THE DRAWING

For the purpose of clarification the following describes the invention by means of two examples and drawings, wherein.

DETAILED DESCRIPTION OF PREFERRED EMBODIMENTS

Figure 1:
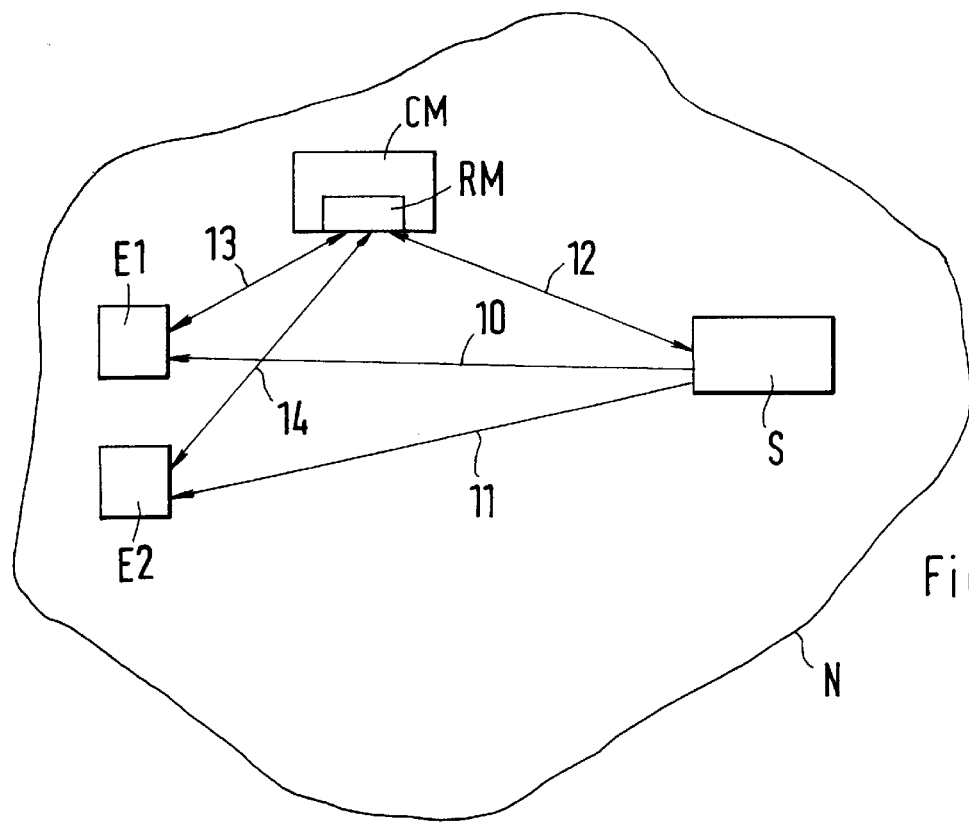
FIG. 1 is a first example of a telecommunications network with a control mechanism according to the invention, in which the method of the invention can be carried out without an intermediate storage of the data.

FIG. 1 illustrates a telecommunications network N with a subscriber who represents a data sender S, and two further subscribers representing a first data receiver E1 and a second data receiver E2. A control mechanism CM for a data fetching service is located in the telecommunications network N. The control mechanism CM contains a receiving means RM, particularly for receiving signal messages from the sender S and the receivers E1 and E2. Said signal messages can be received via communications paths. A first communications path 12 is located between the control mechanism CM and the sender S, a second communications path 13 between the control mechanism CM and the first receiver E1, and a third communications path 14 between the control mechanism CM and the second receiver E2. A first transmission path 10 and a second transmission path 11 can be used to transmit data from the sender S to the first receiver E1 or to the second receiver E2. The communication and transmission paths may be switched connections. But it is also possible to carry out a connectionless transmission through them. The control mechanism CM determines and controls the procedures for performing the fetching service. In the present embodiments the sender S prepares the data for fetching. To that end the sender S has a memory in which the data are stored until they are fetched. The sender S now signals a data fetching request to the control mechanism CM via the first communications path 12. The receiving means RM of the control mechanism CM receives the request signalled by the sender S. Advantageously the control mechanism CM then informs the sender S of the reception and acceptance of the request, so that the sender S can depend on the control mechanism CM carrying out the request. After the request is received, the control mechanism CM checks when the data are to be fetched from sender S.

To that end there are several criteria which can be checked. Such criteria are for example the momentary load of the telecommunications network N, the load of the control mechanism CM for processing requests, or other criteria that are favorable for the operation of the fetching service. Thus if the control mechanism CM determines that at least one of the criteria has been fulfilled, it causes and controls the fetching of the data from the sender S. The determination of the time at which the data is to be fetched from the sender S therefore does not depend on the sender S, but on the control mechanism CM. When conveying the request it is also advantageously possible for the sender S to signal the control mechanism CM that the request is not urgent. This is particularly important when the control mechanism CM does not exclusively carry out data fetching requests whose time it determines by itself, but also receives requests to be carried out immediately.

Beyond that it is also possible for the sender S to provide the control mechanism CM with a time frame during which the data fetching request must be carried out by the control mechanism CM. It can be imagined that the control mechanism CM takes such provisions by the sender S into account when it calculates the fees for carrying out the request. The less busy the control mechanism CM is when it determines the time of the data fetching from the sender S, the lower may be the fee.

In the present first example, the data to be fetched from the sender S are to be transported to the first receiver E1 and the second receiver E2. The sender S therefore signals the two receivers E1 and E2 to the control mechanism CM. At the time determined by the control mechanism CM, the data are then transported by the sender S via the first transmission path 10 to the first receiver E1, and via the second transmission path 11 to the second receiver E2. If necessary the data are duplicated before transportation to the two receivers E1 and E2. In the present first example the transportation of the data from the sender S to the two receivers E1 and E2 takes place in accordance with FIG. 1, without the intermediate storage of the data in a memory assigned to the control mechanism CM. Thus to perform the fetching service, no intermediate memories are required for the intermediate storage of the data for transportation from the sender S to the receivers. Before the transportation of the data the control mechanism CM advantageously checks whether the two receivers E1 and E2 are ready to receive and store the data. This can insure that the transportation of the data does not take place if the receivers E1 and E2 are not ready to receive the data. This check of the readiness to receive by receivers E1 and E2 can be carried out by the control mechanism CM at any time before the transportation of the data. In a further advantageous embodiment of the invention, the respective receiver E1 and E2 authenticates itself to the control mechanism CM before the data are delivered. As an alternative it is also possible that the check of the readiness to receive the data by the receivers E1 and E2 is performed by the sender S. It is useful if this check by the sender S is performed before the request to fetch the data is signalled to the control mechanism CM. The sender S only signals the request to fetch the data if at least one of the receivers E1 and E2 states that it is ready to receive the data.

Figure 2:
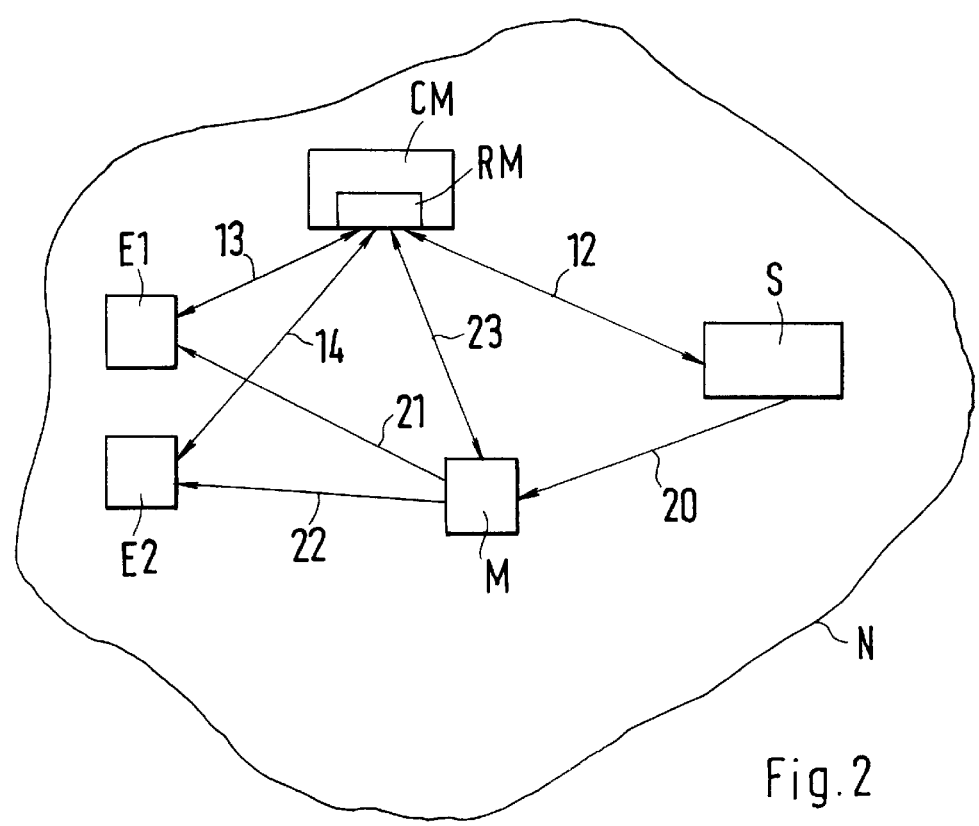
FIG. 2 is a second example of the telecommunications network whereby the method of the invention can be carried out with an intermediate storage.

FIG. 2 illustrates a second example of the telecommunications network N with the control mechanism CM of the invention, in which the method of the invention can be carried out with the intermediate storage of the data in a memory M. The same designations as in FIG. 1 are used for the same elements, or those operating in the same manner.

Once the control mechanism CM has determined the time at which the fetching of the data from the sender S takes place, the data are transported via a third transmission path 20 from the sender S to the memory M, where they are stored. The control mechanism CM can then communicate with the memory M via a fourth communications path 23. The receivers E1 and E2 of the control mechanism CM signal via the communications paths 13 and 14 that the data stored in the memory M are to be transported to the receivers E1 and E2. The control mechanism CM then causes the transportation of the data via a fourth transmission path 21 to the first receiver E1 and via a fifth transmission path 22 to the second receiver E2. In that case the transportation of the data from the memory M to the first receiver E1 and to the second receiver E2 can take place either immediately after the request from both receivers E1 and E2, or at a later time which is determined by the control mechanism CM in accordance with at least one criterion, as already described earlier. In that case it is also possible for the control mechanism CM to first inquire with the receivers E1 and E2 whether they are ready to receive the data fetched from the sender S and stored in the memory M.

All of the variations in the embodiment of the invention described in FIG. 1, which are executed without intermediate storage, can also be transferred to the example in FIG. 2 which includes the intermediate storage of the data in the memory M.

It is furthermore also possible for the sender S or the control mechanism CM to assign an identification to the data to be fetched and that the control mechanism CM only causes the transportation of the data to the receivers E1 and E2 if they have previously signalled the assigned data identification to the control mechanism CM. This increases the security against unauthorized access to the data. Since the sender S does not necessarily know when the data will be fetched from it, but must still ensure that only the appointed control mechanism CM can access the data to be fetched from the sender S, it is advantageous if the control mechanism CM authenticates itself to the sender S before the data are fetched.

To carry out or apply the invention it is not necessary for the sender S to signal to the control mechanism CM one or more receivers of the data to be fetched. It is also possible to store the data to be fetched in a memory assigned to the control mechanism CM, for example the memory M in FIG. 2, and that only predetermined receivers, but also any number of receivers, can access the data as a function of the degree of confidentiality.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. Method for a data fetching service in a telecommunications network (N), which comprises a data sender (S) and a control mechanism (CM) for controlling the fetching service,
   wherein the sender (S) prepares data for fetching,
   wherein the sender (S) and the control mechanism (CM) are linked by a communication path (12) of the telecommunications network (N),
   wherein the sender (S) signals a data fetching request to the control mechanism (CM) over the communication path (12) of the telecommunications network (N), and
   wherein the control mechanism (CM) receives the signalled request, characterized in that after receiving the request, the control mechanism (CM) determines in accordance with at least one criterion when the data are to be fetched from the sender (S).

2. Method as claimed in claim 1, characterized in that after receiving the request the control mechanism (CM) signals the acceptance of the request to the sender (S).

3. Method as claimed in claim 2, characterized in that the sender (S) signals a lack of urgency to the control mechanism (CM).

4. Method as claimed in claim 2, characterized in that the sender (S) provides to the control mechanism (CM) a time frame during which the request must be carried out.

5. Method as claimed in claim 2, characterized in that the telecommunications network (N) contains one or several receivers (E1, E2), and that the sender (S) signals one or several receivers (E1, E2) to which the fetched data are to be transported.

6. Method as claimed in claim 2, characterized in that the control mechanism (CM) causes the data that were fetched from the sender (S) to be stored in a memory (M), that one or several receivers (E1, E2) signal the control mechanism (CM) that the data are to be transported to the one or to each of the receivers (E1, E2), and that the control mechanism (CM) causes the data to be transported to the one or to each of the receivers (E1, E2).

7. Method as claimed in claim 6, characterized in that the sender (S) assigns an identification to the data to be fetched, and that the control mechanism (CM) causes the data to be transported to the one or to each of the receivers (E1, E2) when the one or each of the receivers (E1, E2) signals the identification assigned to the data to the control mechanism (CM).

8. Method as claimed in claim 1, characterized in that the sender (S) signals a lack of urgency to the control mechanism (CM).

9. Method as claimed in claim 8, characterized in that the sender (S) provides to the control mechanism (CM) a time frame during which the request must be carried out.

10. Method as claimed in claim 8, characterized in that the telecommunications network (N) contains one or several receivers (E1, E2), and that the sender (S) signals one or several receivers (E1, E2) to which the fetched data are to be transported.

11. Method as claimed in claim 8, characterized in that the control mechanism (CM) causes the data that were fetched from the sender (S) to be stored in a memory (M), that one or several receivers (E1, E2) signal the control mechanism (CM) that the data are to be transported to the one or to each of the receivers (E1, E2), and that the control mechanism (CM) causes the data to be transported to the one or to each of the receivers (E1, E2).

12. Method as claimed in claim 11, characterized in that the sender (S) assigns an identification to the data to be fetched, and that the control mechanism (CM) causes the data to be transported to the one or to each of the receivers (E1, E2) when the one or each of the receivers (E1, E2) signals the identification assigned to the data to the control mechanism (CM).

13. Method as claimed in claim 1, characterized in that the sender (S) provides to the control mechanism (CM) a time frame during which the request must be carried out.

14. Method as claimed in claim 13, characterized in that the telecommunications network (N) contains one or several receivers (E1, E2), and that the sender (S) signals one or several receivers (E1, E2) to which the fetched data are to be transported.

15. Method as claimed in claim 13, characterized in that the control mechanism (CM) causes the data that were fetched from the sender (S) to be stored in a memory (M), that one or several receivers (E1, E2) signal the control mechanism (CM) that the data are to be transported to the one or to each of the receivers (E1, E2), and that the control mechanism (CM) causes the data to be transported to the one or to each of the receivers (E1, E2).

16. Method as claimed in claim 15, characterized in that the sender (S) assigns an identification to the data to be fetched, and that the control mechanism (CM) causes the data to be transported to the one or to each of the receivers (E1, E2) when the one or each of the receivers (E1, E2) signals the identification assigned to the data to the control mechanism (CM).

17. Method as claimed in claim 1, characterized in that the telecommunications network (N) contains one or several receivers (E1, E2), and that the sender (S) signals one or several receivers (E1, E2) to which the fetched data are to be transported.

18. Method as claimed in claim 17, characterized in that the data to be fetched from the sender (S) are transported to the one or to each of the receivers (E1, E2) without any intermediate storage.

19. Method as claimed in claim 18, characterized in that the one or each of the receivers (E1, E2) authenticates itself to the control mechanism (CM) before the data are transported.

20. Method as claimed in claim 18, characterized in that before the data are transported, the one or each of the receivers (E1, E2) signals that it is ready to receive the data.

21. Method as claimed claim 18, characterized in that the sender (S) checks whether the one or each of the receivers (E1, E2) is ready to receive the data, and that the sender (S) signals the request to the control mechanism (CM) if at least one of the receivers (E1, E2) is ready to receive the data.

22. Method as claimed in claim 17, characterized in that the one or each of the receivers (E1, E2) authenticates itself to the control mechanism (CM) before the data are transported.

23. Method as claimed in claim 22, characterized in that before the data are transported, the one or each of the receivers (E1, E2) signals that it is ready to receive the data.

24. Method as claimed claim 22, characterized in that the sender (S) checks whether the one or each of the receivers (E1, E2) is ready to receive the data, and that the sender (S) signals the request to the control mechanism (CM) if at least one of the receivers (E1, E2) is ready to receive the data.

25. Method as claimed in claim 17, characterized in that before the data are transported, the one or each of the receivers (E1, E2) signals that it is ready to receive the data.

26. Method as claimed claim 17, characterized in that the sender (S) checks whether the one or each of the receivers (E1, E2) is ready to receive the data, and that the sender (S) signals the request to the control mechanism (CM) if at least one of the receivers (E1, E2) is ready to receive the data.

27. Method as claimed in claim 1, characterized in that the control mechanism (CM) causes the data that were fetched from the sender (S) to be stored in a memory (M), that one or several receivers (E1, E2) signal the control mechanism (CM) that the data are to be transported to the one or to each of the receivers (E1, E2), and that the control mechanism (CM) causes the data to be transported to the one or to each of the receivers (E1, E2).

28. Method as claimed in claim 27, characterized in that the sender (S) assigns an identification to the data to be fetched, and that the control mechanism (CM) causes the data to be transported to the one or to each of the receivers (E1, E2) when the one or each of the receivers (E1, E2) signals the identification assigned to the data to the control mechanism (CM).

29. Method as claimed in claim 1, characterized in that before the data are fetched, the control mechanism (CM) authenticates itself to the sender (S).

30. The method of claim 1, wherein said criterion relates to utilization of said network load capacity, control mechanism load, or operation of the fetching service.

31. Control mechanism (CM) for a data fetching service in a telecommunications network (N), with a receiving means (RM) for receiving a signal from a sender (S) of the telecommunications network (N), whereby the sender (S) and the control mechanism are linked by a communication path (12) of the telecommunications network, whereby the sender conveys a data fetching request to the control mechanism (CM), characterized in that the control mechanism (CM) is designed so that after receiving the request it checks whether at least one criterion has been fulfilled, and if this is the case it causes the data to be fetched from the sender (S), so that the time of the data fetching from the sender (S) is determined by the control mechanism (CM).

32. The method of claim 31, wherein said criterion relates to utilization of said network load capacity, control mechanism load, or operation of the fetching service.

* * * * *